(12) United States Patent (10) Patent No.: US 7,490,043 B2
Tavares (45) Date of Patent: Feb. 10, 2009

(54) SYSTEM AND METHOD FOR SPEAKER VERIFICATION USING SHORT UTTERANCE ENROLLMENTS

(75) Inventor: Clifford Tavares, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 11/052,944

(22) Filed: Feb. 7, 2005

(65) Prior Publication Data

US 2006/0178885 A1 Aug. 10, 2006

(51) Int. Cl.
*G10L 17/00* (2006.01)
(52) U.S. Cl. ...................... 704/273; 382/115
(58) Field of Classification Search ................. 704/273; 382/115
See application file for complete search history.

(56) References Cited

U.S. PATENT DOCUMENTS

| | | | | |
|---|---|---|---|---|
| 3,700,815 | A | * | 10/1972 | Doddington et al. ........ 704/246 |
| 4,989,248 | A | * | 1/1991 | Schalk et al. ............... 704/252 |
| 5,377,301 | A | | 12/1994 | Rosenberg et al. |
| 5,805,719 | A | | 9/1998 | Pare, Jr. et al. |
| 6,119,084 | A | * | 9/2000 | Roberts et al. .............. 704/246 |
| 6,219,642 | B1 | | 4/2001 | Asghar et al. |
| 6,347,297 | B1 | | 2/2002 | Asghar et al. |
| 6,393,397 | B1 | * | 5/2002 | Choi et al. .................. 704/250 |
| 6,418,412 | B1 | | 7/2002 | Asghar et al. |
| 6,493,875 | B1 | | 12/2002 | Eames et al. |
| 6,556,969 | B1 | | 4/2003 | Assaleh et al. |
| 6,647,015 | B2 | | 11/2003 | Malkemes et al. |
| 6,760,701 | B2 | | 7/2004 | Sharma et al. |
| 6,799,056 | B2 | | 9/2004 | Curley et al. |
| 6,804,647 | B1 | | 10/2004 | Heck et al. |
| 7,356,168 | B2 | * | 4/2008 | Tavares ....................... 382/115 |
| 2004/0125799 | A1 | | 7/2004 | Kelton et al. |

OTHER PUBLICATIONS

Simoens et al., "The Evolution of 5 GHz WLAN Toward Higher Throughputs", IEEE Wireless Communications, pp. 6-13, Dec. 2003.
IEEE Standard for Information technology, Part 11: Wireless LAN Medium Access Control (MAC) and Physical Layer (PHY) specifications, IEEE Std. 802.11, 1999.
IEEE Standard for Information technology, Part 11: Wireless LAN Medium Access Control (MAC) and Physical Layer (PHY) specifications, IEEE Std. 802.11e, 2005.
Cisco Systems, Wireless Quality-of-Service, Deployment Guide, 1-23, 2003.

* cited by examiner

*Primary Examiner*—Susan McFadden
(74) *Attorney, Agent, or Firm*—Squire, Sanders & Dempsey, L.L.P.

(57) ABSTRACT

In a system and method verifying an identity of a speaker, feature vectors are received that were extracted from an utterance made by a speaker claiming an identity. Dissimilarity may be measured between the feature vectors and a codebook associated with a version of the utterance known to be made by the identity. The utterance may be further analyzed to ascertain information about repeating occurrences of the feature vectors in the utterance. The information about repeating occurrences of feature vectors occurring in the utterance may be compared to information about repeating occurrences of feature vectors in a version of the utterance known to be made by the claimed identity. Based on the comparison, a penalty may be assigned to the measured dissimilarity. Using the measured dissimilarity modified by the assigned penalty, a determination may be made as to whether to accept the speaker as the identity.

11 Claims, 6 Drawing Sheets

0
SYSTEM AND METHOD FOR SPEAKER VERIFICATION USING SHORT UTTERANCE ENROLLMENTS

TECHNICAL FIELD

Embodiments of the present invention relate to speech recognition and more particular to speaker verification systems and methods.

BACKGROUND

Verification (also known as authentication) is a process of verifying the user is who they claim to be. A goal of verification is to determine if the user is the authentic enrolled user or an impostor. Generally, verification includes four stages: capturing input; filtering unwanted input such as noise; transforming the input to extract a set of feature vectors; generating a statistical representation of the feature vector; and performing a comparison against information previously gathered during an enrollment procedure.

Speaker verification systems (also known as voice verification systems) attempt to match a voice of a speaker whose identity is undergoing verification with a known voice. Speaker verification systems help to provide a means for ensuring secure access by using speech utterances. Verbal submission of a word or phrase or simply a sample of an individual speaker's speaking of a randomly selected word or phrase are provided by a claimant when seeking access to pass through a speaker recognition and/or speaker verification system. An authentic claimant is one whose utterance matches known characteristics associated with the claimed identity.

To train a speaker verification system, a claimant typically provides a speech sample or speech utterance that is scored against a model corresponding to the claimant's claimed identity and a claimant score is then computed to confirm that the claimant is in fact the claimed identity.

Conventional speaker verification systems typically suffer in terms of relatively large memory requirements, an undesirable high complexity, and an unreliability associated with each of the first conventional method and the second conventional method to perform speaker verification. For example, in many speaker verification systems, Hidden Markov Models (HMM) are used to model speaker's voice characteristics. Using Hidden Markov Models, however, may be very expensive in terms of computation resources and memory usage making Hidden Markov Models less suitable for use in resource constrained or limited systems.

Speaker verification systems implementing vector quantization (VQ) schemes, on the other hand, may have low computation and memory usage requirement. Unfortunately, vector quantization schemes often suffer from a drawback of not taking into account the variation of a speaker's voice over time because typical vector quantization schemes represent a "static-snapshot" of a person's voice over the period of an utterance.

Another challenge posed under real-life operating environments is that noise and background sounds may be detected and considered as part of the utterance and thereby become a source of performance degradation in speaker verification systems. Noise may occur as a result of differences in transducers, acoustic environment, and communication channel characteristics used in a given verification system.

SUMMARY

A system and method are disclosed for verifying an identity of a speaker. In accordance with one embodiment, feature vectors are received that were extracted from an utterance made by a speaker claiming an identity. Dissimilarity may be measured between the feature vectors and a codebook associated with a version of the utterance known to be made by the identity. The utterance may be further analyzed to ascertain information about repeating occurrences of the feature vectors in the utterance. The information about repeating occurrences of feature vectors occurring in the utterance may be compared to information about repeating occurrences of feature vectors in a version of the utterance known to be made by the claimed identity. Based on the comparison, a penalty may be assigned to the measured dissimilarity. Using the measured dissimilarity modified by the assigned penalty, a determination may be made as to whether to accept the speaker as the identity.

In one embodiment, the speaker may be rejected as the claimed identity if the number of repeating occurrences for any of the feature vectors of the utterance exceeds a maximum number. In such an embodiment, an additional penalty may be assigned to the dissimilarity if any of the feature vectors of the utterance is determined to have a number of repeating occurrences exceeding the maximum number. In one implementation, the maximum number for a given feature vector may be obtained by analyzing a plurality of utterances made by a plurality of speakers to identify the utterance of the plurality of utterances having the largest number of repeating occurrences of the given feature vector. In another embodiment, vector quantization may be utilized to measure dissimilarity between the feature vectors and the codebook. In a further embodiment, the utterance may a duration between about 0.1 seconds and about 5 seconds and/or may comprise a multi-syllabic utterance.

In one embodiment, the assigned penalty may comprise a penalty for each of the feature vectors of the utterance. In one implementation of such an embodiment, the assigned penalty for each feature vector may be based on a difference between a number of repeating occurrences of the respective feature vector of the utterance and a number of repeating occurrences of the corresponding feature vector of the version of the utterance know to be made by the identity. In another implementation, the assigned penalty for given feature vector may be adjusted based on the degree of difference between the number of repeating occurrences of the respective feature vector of the utterance and the number of repeating occurrences of the corresponding feature vector of the version of the utterance know to be made by the identity. In a further implementation, the assigned penalty for each feature vector may be adjusted to account for operational characteristics of a device used to capture the utterance by the speaker. In one implementation, no penalty may be assigned to a given feature vector if the difference between the number of repeating occurrences of the respective feature vector of the utterance and the number of repeating occurrences of the corresponding feature vector of the version of the utterance know to be made by the identity is determined to be less than an expected difference of repeating occurrences occurring due to expected changes in voice. In another implementation, the assigned penalty for a given feature vector may be reduced if the difference between the number of repeating occurrences of the respective feature vector of the utterance and the number of repeating occurrences of the corresponding feature vector of the version of the utterance know to be made by the identity is determined to be less than a predefined value.

In an additional embodiment, the measured dissimilarity modified by the assigned penalty may be compared to a valid-imposter model associated with the utterance when the determining whether to accept the speaker as the identity. In a further embodiment, the utterance may comprise a plurality of frames. In such an embodiment, the analysis of the utterance may include identifying the feature vectors occurring in each frame, counting the instances that each different feature vector of the utterance occurs in all of the frames to obtain a sum of repeating occurrences of each feature vector, and dividing each sum by a total number of repeating occurrences occurring in the utterance.

In one embodiment, a speaker verification system may be trained by obtaining an utterance that comprises a plurality of frames and has a plurality of feature vectors. In such an embodiment, the feature vectors present in each frame may be identified and the presence of feature vectors by frame for the whole utterance may be tabulated. Next, the number of instances each feature vector is repeated in the utterance may be identified from which a total sum of all repeating instances in the utterance may be calculated. The number of repeats for each feature vector may then be divided by the total sum to obtain an averaged value for each feature vector and the information about the number of repeats for each feature vector may be stored in a reference log associated with the utterance. In one implementation, the reference logs of a plurality of utterances made by a plurality of speakers may be examined to identify a set of feature vectors comprising all of the different feature vectors present in the reference logs. For each different feature vector, the largest number of repeat instances for that feature vector in a single reference log may then be identified and a global reference log may be generated that indicates the largest number of repeat instances for every feature vector.

DETAILED DESCRIPTION

As previously mentioned, Hidden Markov Models may be used to model a speaker's voice characteristics in speaker verification systems, however, use of Hidden Markov Models may be very expensive in terms of computation resources and memory usage. Speaker verification systems implementing vector quantization (VQ) schemes may have low computation and memory usage requirement but often suffer from a drawback of not taking into account the variation of a speaker's voice over time because typical vector quantization schemes represent a person's voice as a static snapshot over the period of an utterance.

Embodiments are described herein for a speaker verification system architecture that uses short utterances for authentication. More specifically, embodiments of the speaker verification system architecture described herein afford a modified vector quantization scheme that may be applicable for use with short utterances.

Standard vector quantization systems typically use a what is known as a codebook. During training, the codebook may be populated with entries that encode the distinct features of a speaker's voice. Once trained, the vector quantization system may then be used to verify a speaker's identity. Features from a speaker claiming to be a valid person (the "claimant") may be compared against the pre-trained codebook. If the claimant is determined to be a close match to a corresponding entry in the code book, the identity of the speaker is verified. Conversely, if the claimant is determined not to be a close match, the claimed identity of the speaker is rejected.

Implementations of the present speaker verification system architecture help to improve upon traditional vector quantization based verification systems by adding a certain amount of information about the variation of voice in time. A codebook's length (i.e., the amount of entries contained in the codebook) should typically be long enough to accommodate all or most of the distinct characteristics of a given speaker's voice. For long utterances input into a speaker verification system, certain characteristics of a speaker's voice repeat over time and thereby cause multiple references for certain entries in the codebook.

On the other hand, most characteristics of a short utterance have been found to be unique. As a result, the occurrence of multiple references for codebook entries may be very little when short utterances are used. Therefore, for a given speaker and utterance, capturing the frequency of reference of codebook entries may result in the capturing of certain temporal properties of a persons voice. During verification, these properties may then be compared (in addition to the standard codebook comparisons).

Figure 1:
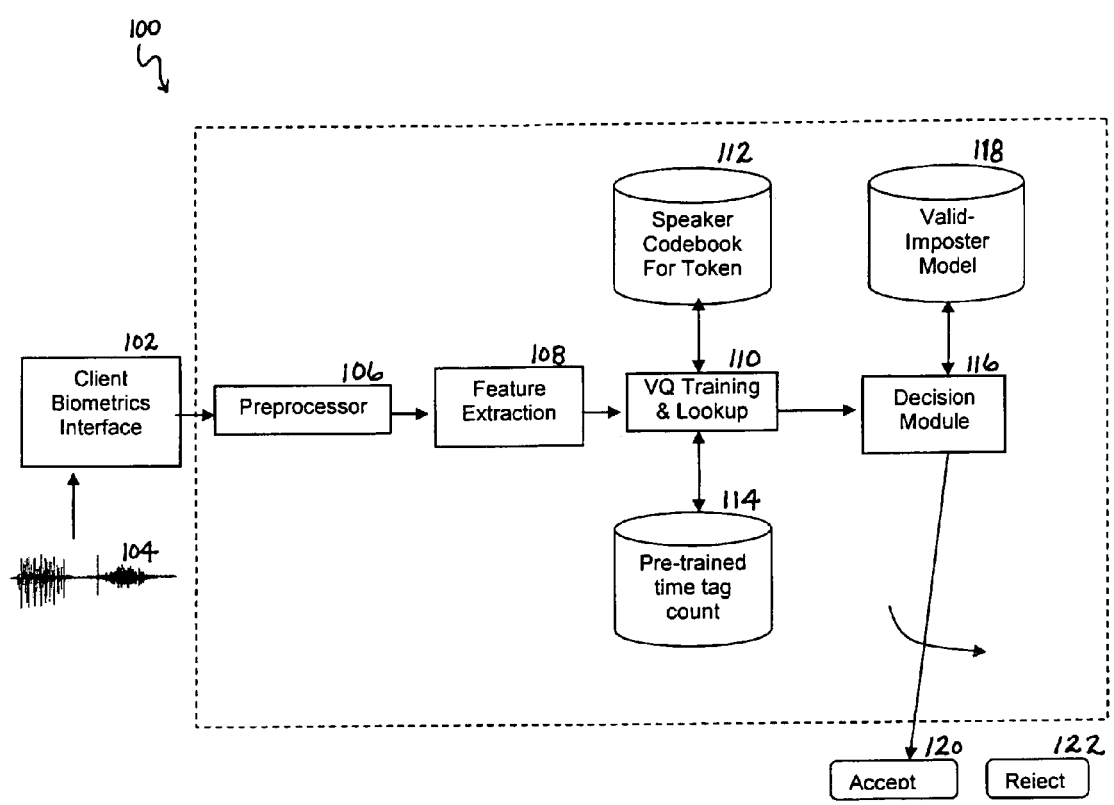
FIG. 1 is a schematic block diagram of an illustrative verification system architecture for a speaker verification engine in accordance with one embodiment.

FIG. 1 is a schematic block diagram of an illustrative verification system architecture 100 for a speaker verification engine in accordance with one embodiment. The verification system architecture 100 may include a biometrics interface component 102 for receiving biometric input from a subject (i.e., a speaker). As shown in the implementation of FIG. 1, the biometrics interface component 102 may be adapted for receiving speech input 104 (i.e., sounds or utterances) made by the subject. A pre-processor component 106 may be coupled to the biometric interface component for receiving biometric input(s) 104 captured by the biometric interface component and converting the biometric input into a form usable by biometric applications. An output of the pre-processor component 106 may be coupled to a feature extraction component 108 that receives the converted biometric input from the pre-processor component 106. A training and lookup component 110 (more specifically, a vector quantization training and lookup component) may be coupled to the feature extraction component 108 to permit the training and lookup component 110 to receive data output from the feature extraction component 108. The training and lookup component 110 may be utilized to perform vector quantization and repeating feature vector analysis on the feature vectors extracted from the utterance 104. The training and lookup component 110 may further be coupled to a codebook database 112 (more specifically, a speaker codebook for token database) and a time tag count database 114 (more specifically, a pre-trained time tag count database or a reference log database) to which the training and lookup component 110 may read and/or write data during training and verification.

The codebook database 112 and time tag count database 114 may each reside in suitable memory and/or storage devices.

The verification system architecture 100 may further include a decision module/component 116 that may be coupled to the training and lookup component 110 to receive data/information output from the training and lookup component 110. A valid-imposter model database 118 residing in a suitable memory and/or storage device may be coupled to the decision module to permit reading and writing of data to the valid-imposter model database 118. The decision module 116 may utilize data obtained from the training and lookup component 110 and the valid-imposter model database 118 in order to determine whether to issue an acceptance 120 or rejection 122 of the subject associated with the speech input 104 (i.e., decide whether to verify or reject claimed identity of the speaker).

Figure 2A:
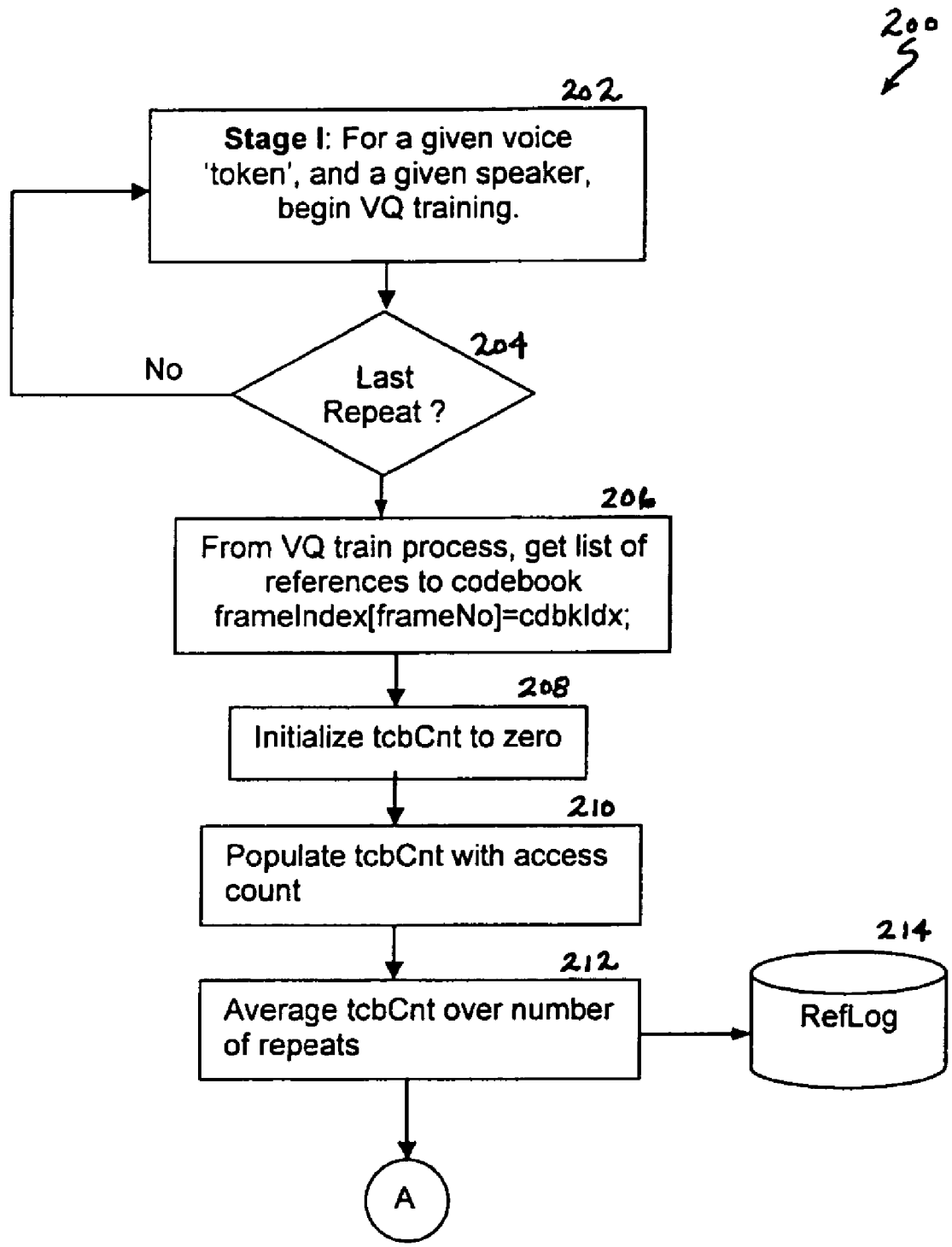
FIGS. 2A and 2B show a flowchart of a vector quantization training process in accordance with one embodiment.
Figure 2B:
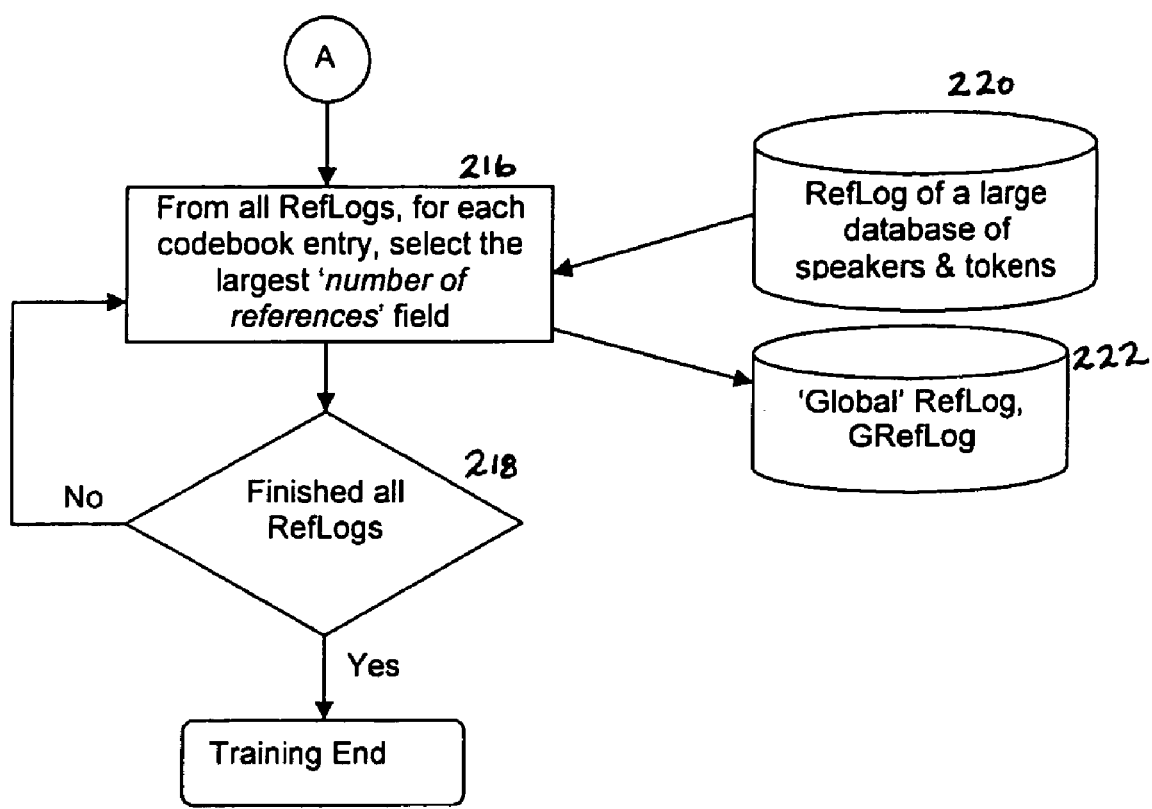

FIGS. 2A and 2B show a flowchart of a vector quantization training process 200 in accordance with one embodiment. In one implementation, the training process 200 may be performed by the training and lookup component 110 described in FIG. 1.

As previously mentioned, typical speech verification systems most systems require input of a long spoken password or a combination of short utterances in order to successfully carry out speaker verification. In such systems, reduction in the length of spoken password may cause the accuracy of speaker verification to drop significantly. Implementations of the verification system architecture described herein may use uses a low complexity modified vector quantization technique. These modifications are intended to take into account the variations of voice with time in a fashion similar to dynamic programming (DTW) and HMM while still taking advantage of the lower execution time of vector quantization techniques.

In operation 202, vector quantization training is carried out for a given voice token and a given speaker. The vector quantization training may use any known vector quantization training techniques in order to perform operation 202. For example, the training may utilize a Linde, Buzo, and Gray (LBG) algorithm (also referred to as a LBG design algorithm). The vector quantization training in operation 202 may be repeated for each voice token and speaker until the vector quantization training process is completed for all voice tokens and speakers (see decision 204).

In operation 206, a list of references to a codebook are obtained from the vector quantization training process carried out in operation 202. The list of references to the codebook may comprise a listing of all of the feature vectors occurring in the utterance. As shown in FIG. 2A, operation 206 may utilize the following exemplary pseudo-code:

frameIndex[frameNo]=cdbkIdx where:
"frameIndex" is a map between the speech frames and the codebook entries for all repeats collated end to end;
"frameNo" is a value of between the set {1 . . . Maxframe} and the closest match codebook entry; and
"cdbkIdx" is a value in the set {1 . . . codebook length}.

As set forth in the above pseudo code, the list of references may comprise the frameIndex which maps the feature vectors found in the utterance to the particular frame(s) of the utterance in which each feature vector is found. As an illustrative example, in an utterance comprising frames x, y, and z, and feature vectors a, b, c, and d, the list of reference (i.e., frameIndex) may identify that feature vector a occurs in frame x and frame z, which feature vectors b and c occur in frame y and feature vector d occurs in frame z.

In operation 208, a token cookbook count ("tcbCnt") is initialized to zero. In operation 210, the token cookbook count is populated with an access count. The access count may reflect the number of occurrences that a given feature vector occurs in the utterance. Continuing with the previous illustrative example, operation 208 would generate an access count of 2 for feature vector a and an access count of 1 for each of feature vectors b, c, and d. An implementation of operation 210 may be further described with the following exemplary pseudo-code:

```
for ii=1 to Maxframe
    // increment cb entry access count
    RefLog(i(ii))=RefLog(frameIndex[frameNo])+1;
end
```

The token cookbook count may then be averaged with respect to the number of repeats in operation 212 as illustrated by the following exemplary pseudo-code:

```
// average index over number of repeats
for ii=1 to cdbk_size
    RefLog(ii)=RefLog(ii)/numberOfRepeats;
end
```

Thus, in operation 212, the total number of occurrences of any given feature vector in the utterance may be divided by the total number of repeating occurrences of feature vectors found in the utterance to average the total access count of each feature vector in the frameIndex.

The data obtained in operations 210 and 212 for each token may be stored in a reference log 214 ("RefLog") that may reside in a memory and/or storage device (e.g., database 114 of FIG. 1). Each token's reference log 214 reflects the number of references by speech frames to each codebook entry. An exemplary format for the reference log 214 is presented in the following table:

| Codebook entry | Number of references (by speech frames) |
|---|---|
| 1 | |
| 2 | |
| . . . | |
| Codebook Size – 1 | |
| Codebook Size | |

As shown in the preceding table, a given token's reference log 214 may include codebook entries (i.e., the left hand column) for an entry equal to one all the way to an entry equal to the codebook size for that particular token. In the right hand column of the illustrative reference log 214, the number of occurrences of a given feature vector in a given feature vector as well as the total number of occurrences of the given feature vector in the utterance may be stored. For example, if the codebook entry "1" in the above table corresponds to the feature vector a from our previous illustrative scenario, then the right hand column of the table may indicate in the row for codebook entry "1" that the feature vector a occurs once in frames x and z for a total of two occurrences in the utterance (i.e., a repeating occurrence of two for feature vector a).

With reference to operation 216 and decision 218, during training, the reference logs for all tokens are combined to generate new reference log that comprises the maximum number of codebook references. Reference logs are obtained from a database 220 having reference logs for a large number of speakers and tokens. For each codebook entry, the largest number of references field is selected from all reference logs and used to populate a global reference log 222 (GRefLog).

An exemplary format for the global reference log database 222 is presented below in the following table (and is similar to the exemplary format for the reference log 214):

| Codebook entry | Number of references (by speech frames) |
|---|---|
| 1 | |
| 2 | |
| ... | |
| Codebook Size − 1 | |
| Codebook Size | |

As an illustration of the operations 216 and 218, if codebook entry 1 is found to repeat twice in a first reference log, three times in a second reference log, and five times in a third (and last) reference log, then the number of reference entry for codebook entry 1 in the GRefLog would be set to a value of five repeats. Like the RefLog(s), the generated GRefLog may reside in a memory and/or storage device (e.g., database 114 of FIG. 1).

Figure 3:
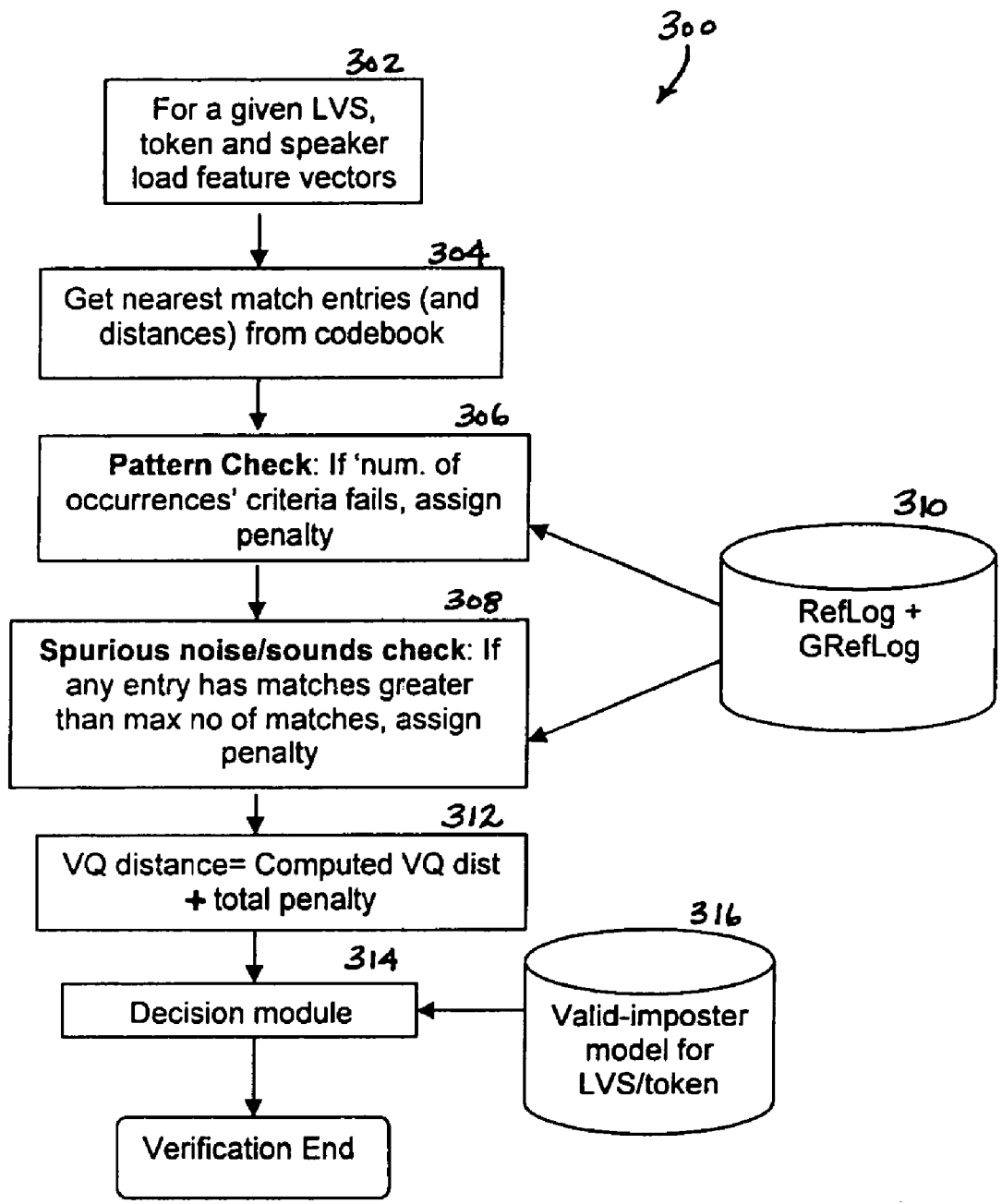
FIG. 3 shows a flowchart for a vector quantization verification process in accordance with one embodiment.

FIG. 3 shows a flowchart for a vector quantization verification process 300 in accordance with one embodiment. With this verification process an utterance of a speaker claiming a particular identity (i.e., a claimant) may be analyzed to determine whether the speaker is in fact the claimed identity. In operation 302, feature vectors may be loaded for a given language vocabulary subset, token and speaker. For these feature vectors, the nearest matching entries may be obtained from a codebook in operation 304. In addition, the distances (i.e., distortion measures) between the feature vectors and matching entries may also be determined in operation 304.

In operation 306, a pattern check may be performed. If criteria relating to the number of occurrences fails, a penalty may be assigned. An implementation of operation 306 may be further described with the following exemplary pseudo-code:

```
verifyRefLog=Generate RefLog for verification token;
stg= Total num of references for token from verifyRefLog;
stc= Total num of references for token from RefLog;
sumPenalty=0;
// normalize no. of accesses
fact=stg/stc;
verifyRefLog[1 ... cdbk_size] = verifyRefLog [1 ... cdbk_size]/fact;
// Assign penalty based on difference between verifyRefLog and RefLog
for cb = 1:cdbk_size
    mx=max(verifyRefLog (cb),RefLog(cb));
    mn=min(verifyRefLog (cb),RefLog(cb));
    if(((mx−mn)>= noiseMin) & (mx>=mn*diffFact))
        if((mx−mn)<=validDiff)
            patDif=(mx−mn)/2;
        else
            patDif=(mx−mn)*1.5;
        end
        penalty=patDif*eer;
        sumPenalty=sumPenalty+penalty;
    end
end
distance=VQdist+sumPenalty
``` where:

"verifyRefLog" is a RefLog generated from the feature vectors extracted from the utterance made by the claimant. The verifyRefLog may be generated by obtaining information the repeating occurrences of feature vectors in the utterance of the claimant using a similar process as that set forth in operations 206-212 of FIGS. 2A and 2B.

"noiseMin" is the observed variation in the number of references due to natural changes in voice. In the above example, noiseMin is set to a value of 2.

"diffFact" represents factor differences between number of references of RefLog and verifyRefLog. Use of a large value allows larger variations with a person's voice before penalty is applied. Small values cause the reverse effect. In the about example, diffFact is set to a value of 2.

"validDiff" is a value. Differences below this value represent a lower possibility of error (impostor), therefore, a small penalty (50% of difference) is applied. In this example, it is set to 5. Differences above validDiff represent a high possibility of error and a high penalty is assigned (150% of difference). Alternatively, instead of 2 fixed penalties, a continuous relationship between the assigned penalty and the validDiff may be used.

"eer" is an equal error rate that is derived from the operational characteristics of the voice biometrics device.

"distance" is the total distance between incoming speech to the speech from the training sessions. A large distance indicates large difference in speech samples.

The pseudo-code for operation 306 describes a pattern match check process. Vector quantization access patterns are stored during enrollment and matched during verification. A penalty is assigned in case of mismatch.

In operation 308, a check for spurious noise and/or sounds may be perform. If any entry is determined to have matches greater than maximum number of matches, then a penalty is assigned. Data relating to the token reference log and the global reference log obtained from a database 310 may be utilized in operations 306 and 308. An implementation of operation 308 may be further described with the following exemplary pseudo-code:

```
for cb = 1:cdbk_size
    if(verifyRefLog(cb)>=GRefLog(cb))
        distance=distance + largePenalty;
    end
end
``` where:

"largePenalty" is a value which should be large enough to cause the distance to indicate an impostor. It should also be noted that the noise/spurious sound check may indicate that a voice activity detector (VAD) is not functioning correctly, allowing spurious non-speech frames to pass through. The value of largePenalty may be adjusted to take into account the behavior or the VAD engine used.

The pseudo code for operation 308 describes a spurious sounds/noise check process. The global pattern match table GRefLog indicates the maximum variation in a person's voice. Variations greater than these values would indicate the presence of spurious sounds or noise.

Next, a modified vector quantization distance (i.e., distortion) is determined in operation 312. As shown, in one implementation, the modified vector quantization distance may be calculated by adding (or subtracting) the sum of penalties (if any) assigned in operations 306 and 308 from the standard vector quantization distance(s) calculated in operation 304.

In operation 314, a decision may be made as to whether accept or reject the identity of a claimant using the adjusted vector quantization distance and a valid-imposter model associated with the given language vocabulary subset and/or token. As shown, operation 314 may be performed by a decision module and the valid-imposter model may be obtained from a valid-imposter model database 316.

It should be noted that constants described in the penalty assignment mechanism(s) set forth in the verification process 300 in FIG. 3 represent a certain tradeoff between requirements of security and flexibility. The assigned penalties (i.e., the value of the assigned penalties) may be changed or adjusted to suit different application scenarios.

Figure 4:
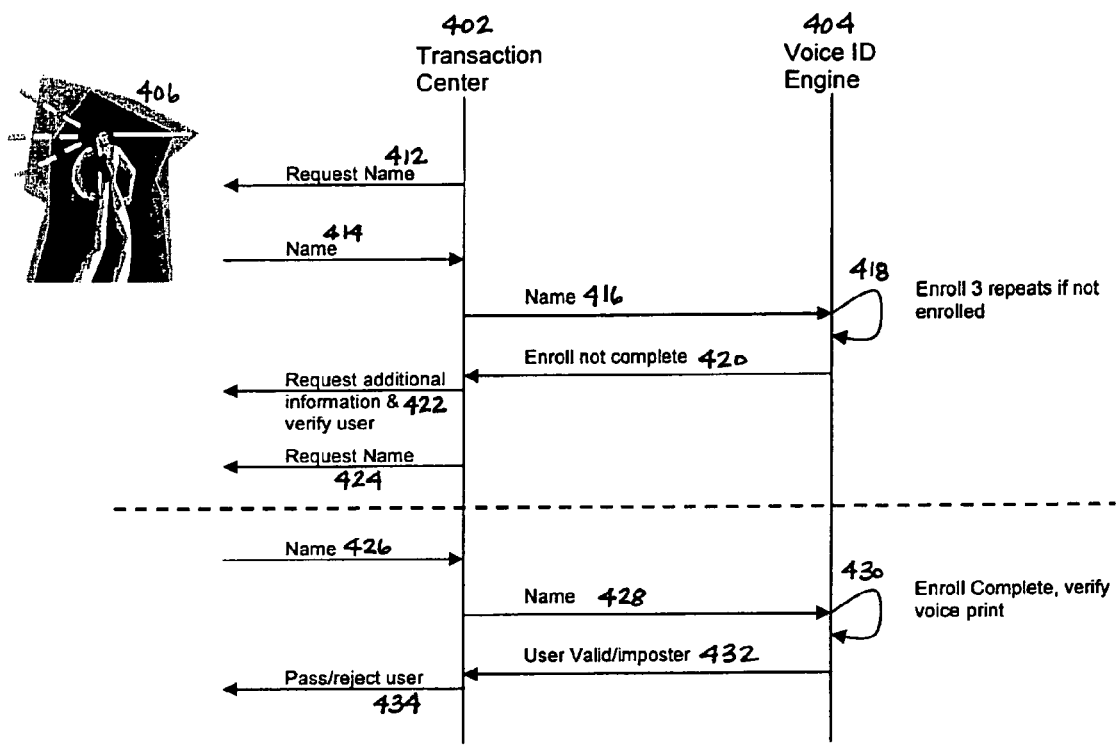
FIG. 4 is a schematic process flow diagram for implementing a verification system architecture in accordance with one embodiment.

FIG. 4 is a schematic process flow diagram for implementing a verification system architecture in accordance with one embodiment. In this embodiment, a transaction center 402 interfaces with a subject 404 and is in communication with a voice identification engine 406. In this embodiment, vector quantization training 408 may generate a RefLog that may be used in vector quantization verification 410 in order to determine the closeness of incoming speech to the speech from the training sessions.

The transaction center 402 requests that the speaker 406 provide a name and the speaker 406 response by vocally uttering a name that is supposed to be associated with the speaker (see operations 412 and 414). The transaction center 402 captures the speaker's utterance and forwards the captured utterance to the voice identification engine 404 in operation 416. The voice identification engine 404 may instruct the transaction center 402 to request that the speaker 402 repeat the utterance a plurality of times and/or provide additional information if the speaker has not already be enrolled into the verification system (see operations 418 and 420). In response to this instruction, the transaction center 402 requests the appropriate information/utterances from the speaker (see operations 422 and 424). Operations 412-424 may be accomplished utilizing the training process 200 set forth in FIGS. 2A and 2B.

After the speaker 406 has completed the training session 408 and thus enrolled with the verification system, the speaker 406 may subsequently may then be subject to verification 410. In the implementation shown in FIG. 4, the speaker 406 provides the transaction center 402 with an utterance (e.g., a spoken name) that is supposed to be associated with a speaker enrolled with the system (see operation 426). The utterance is captured by the transaction center 402 and forwarded to the voice identification engine 404 in operation 428. In operation 430, the voice identification engine 404 verifies the utterance and transmits the results of the verification (i.e., whether the speaker passes or fails verification) to the transaction center and speaker (see operations 432 and 434). Operations 426-434 may be accomplished utilizing the verification process 300 set forth in FIG. 3.

Figure 5:
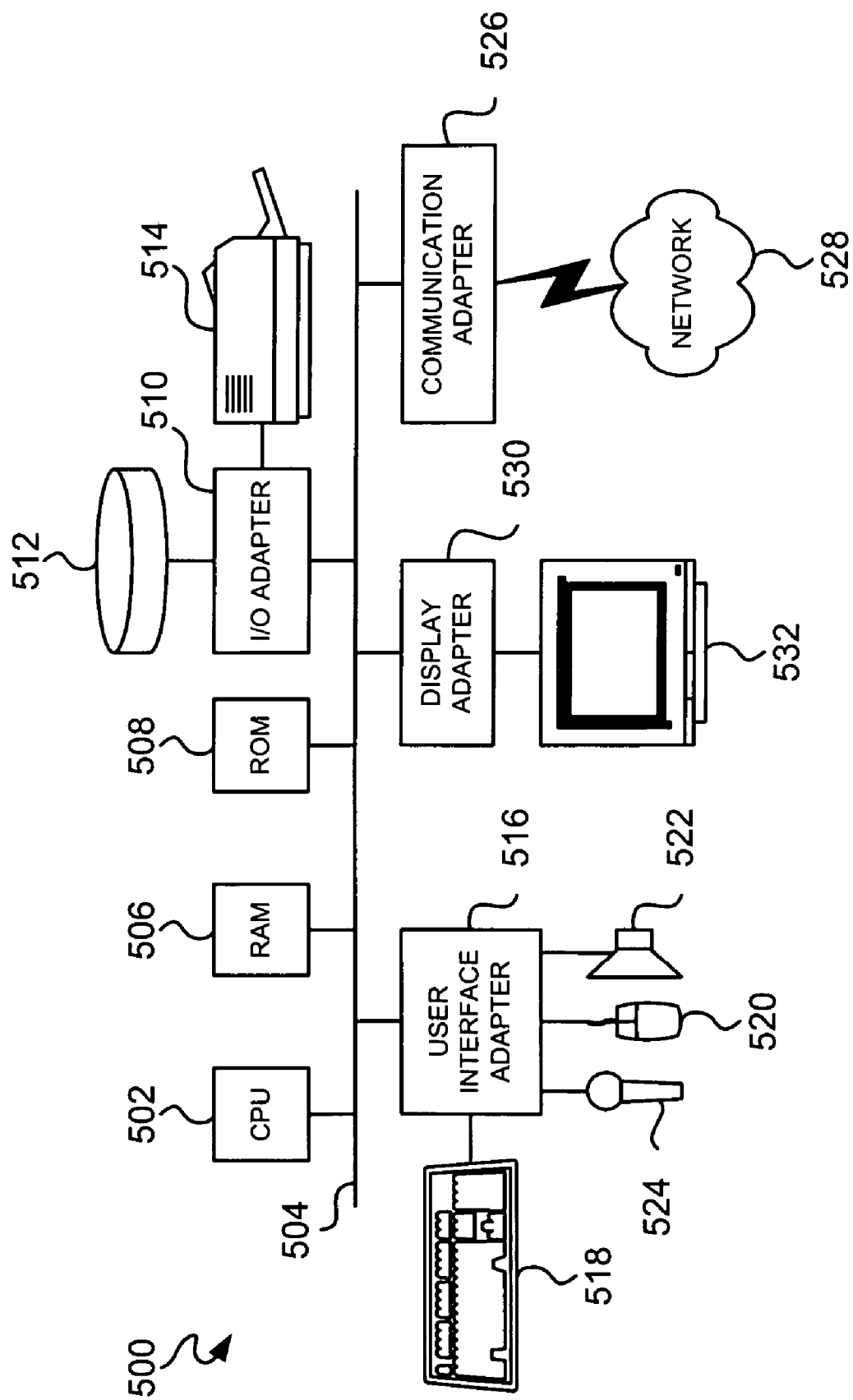
FIG. 5 is a schematic diagram of a representative hardware environment in accordance with an embodiment of the present invention.

FIG. 5 illustrates an exemplary hardware configuration of a workstation 500 having a central processing unit 502, such as a microprocessor, and a number of other units interconnected via a system bus 504. The workstation shown in FIG. 5 includes a Random Access Memory (RAM) 506, Read Only Memory (ROM) 508, an I/O adapter 510 for connecting peripheral devices such as, for example, disk storage units 512, printers 514, and the secure device 124 to the bus 504, a user interface adapter 516 for connecting various user interface devices such as, for example, a keyboard 518, a mouse 520, a speaker 522, a microphone 524, and/or other interface devices such as a touch screen or a digital camera to the bus 504, a communication adapter 526 for connecting the workstation 500 to a communication network 528 (e.g., a data processing network) and a display adapter 530 for connecting the bus 504 to a display device 532. The workstation may utilize an operating system such as, for example, the Microsoft Windows 55, NT, 58, 2000, ME, or XP Operating System (OS), the IBM OS/2 operating system, the MAC OS, Linux OS or UNIX operating system. Those skilled in the art will appreciate that the present invention may also be implemented on platforms and operating systems other than those mentioned. Embodiments of the present invention may also be implemented using computer program languages such as, for example, ActiveX, Java, C, and the C++ language and utilize object oriented programming methodology.

In accordance with the foregoing description systems and methods are disclosed for verifying an identity of a speaker.

In one embodiment, feature vectors are received that were extracted from an utterance (also referred to as a token) made by a speaker (also referred to as a claimant) claiming a particular identity. Some illustrative examples of feature vectors that may be extracted from an utterance include, cepstrum, pitch, prosody, and microstructure. A codebook associated with the identity may then be accessed that includes feature vectors (also referred to as code words, code vectors, centroids) for a version of the utterance known to be made by the claimed identity (i.e., spoken by the speaker associated with the particular identity that the claimant is now claiming to be).

With this codebook, dissimilarity (it should be understood that the similarity—the converse of dissimilarity—may be measured as well or instead of dissimilarity) may be measured between the extracted feature vectors and the corresponding code words (i.e., feature vectors) of the codebook associated with the version of the utterance known to be made by the claimed identity. The measure of dissimilarity/similarity may also be referred to as a distortion value, a distortion measure and/or a distance.

The utterance may be further analyzed to ascertain information about repeating occurrences (also referred to as repeating instances) for each different feature vector found in the utterance. Through this analysis, information about multiple instances of feature vectors (i.e., repeating instances or repeats) occurring in the utterance may be obtained to generate a reference log for the utterance. That is to say, information about the occurrences of feature vectors occurring two or more times in the utterance may be obtained.

The information about repeating occurrences/instances of feature vectors occurring in the utterance may be compared to information about repeating occurrences/instances of feature vectors in a version of the utterance known to be made by the claimed identity (i.e., code words from the codebook associated with the identity) to identify differences in repeating occurrences of feature vectors between the utterance made by the speaker and the utterance known to be made by the claimed identity. In other words, the obtained information about the occurrence of extracted feature vectors having instances occurring more than once in the utterance may be compared to information about feature vectors occurring more than once in a version (or at least one version) of the utterance known to be made by the claimed identity.

Based on the comparison of the information about repeating occurrences/instances, a penalty may be assigned to the measured dissimilarity (i.e., distortion measure) between the feature vectors and the codebook. Using the measured dissimilarity (i.e., distortion measure) as modified by the assigned penalty, a determination may be made as to whether to accept or reject the speaker as the identity.

In one embodiment, the speaker may be rejected as the claimed identity if the number (i.e., count or value) of repeating occurrences for any of the feature vectors of the utterance exceeds a predetermined maximum number of repeating occurrences and thereby indicates the presence of spurious sounds and/or noise in the utterance. In such an embodiment, an additional penalty may be assigned to the dissimilarity if any of the feature vectors of the utterance by the speaker is determined to have a number of repeating occurrences exceeding the maximum number of repeating occurrences. In one implementation, the additional penalty may be of sufficient size to lead to the rejection the utterance when determining whether to accept/validate the speaker as the claimed identity. In another implementation, the predetermined maximum number for a given feature vector may be obtained by analyzing a plurality of utterances made by a plurality of speakers (i.e., known identities) to identify the utterance of the plurality of utterances having the largest number of repeating occurrences of the given feature vector. In such an implementation, the maximum number may be related and/or equal to the identified largest number of repeating occurrences of the given feature vector. This may be accomplished in one embodiment by identifying all of the utterances in the plurality of utterances having the given feature vector and then analyzing this subset of identified utterances to determine which utterance in the subset has the largest number of repeating occurrences for the given feature vector.

In another embodiment, vector quantization may be utilized to measure dissimilarity between the feature vectors of the utterance by the speaker and the codebook associated with the version of the utterance known to have been made by the identity. In one embodiment, the utterance may a duration between about 0.1 seconds and about 5 seconds. In another embodiment, the utterance may have a duration about between about 1 second and about 3 seconds. In yet another embodiment, the utterance may comprise a multi-syllabic utterance (i.e., the utterance may have multiple syllables). The utterance may also comprise a multi-word utterance (i.e., the utterance may be made up of more than one word).

In one embodiment, the assigned penalty may comprise a separate penalty assigned to each of the different feature vectors of the utterance. The measure (i.e., value or amount) of the assigned penalty for each of the different feature vectors may be based on a difference between a number of repeating occurrences of the respective feature vector of the utterance and a number of repeating occurrences of the corresponding feature vector of the version of the utterance know to be made by the identity.

In one implementation, the value of the assigned penalty for given feature vector may be adjusted based on the degree of difference between the number of repeating occurrences of the respective feature vector of the utterance and the number of repeating occurrences of the corresponding feature vector of the version of the utterance know to be made by the identity. In a further implementation, the value of the assigned penalty for each different feature vector may be adjusted to account for operational characteristics of a device used to capture the utterance by the speaker.

In yet another implementation, no penalty may be assigned to a given feature vector if the difference between the number of repeating occurrences of the respective feature vector of the utterance and the number of repeating occurrences of the corresponding feature vector of the version of the utterance know to be made by the identity is determined to be less than an expected difference of repeating occurrences occurring due to expected (i.e., natural) changes in a speaker's voice that may occur when making utterance at different times. In an additional implementation, the value of the assigned penalty for a given feature vector may be reduced if the difference between the number of repeating occurrences of the respective feature vector of the utterance and the number of repeating occurrences of the corresponding feature vector of the version of the utterance know to be made by the identity is determined to be less than a predefined value below which represents a lower possible of error for an incorrect acceptance of the given feature vector as that made by the identity.

In an additional embodiment, the measured dissimilarity (i.e., distortion measure) as modified by the assigned penalty may be compared to a valid-imposter model associated with the utterance when the determining whether to accept or reject the speaker as the identity. In a further embodiment, the utterance may comprise a plurality of frames. In such an embodiment, the analysis of the utterance to ascertain information about repeating occurrences/instances of the feature vectors in the utterance may include identifying the feature vectors occurring in each frame, counting the instances that each different feature vector of the utterance occurs in all of the frames to obtain a sum of repeating occurrences of each feature vector, and averaging the sums by dividing each sum by a total number of repeating occurrences occurring in the utterance.

In one embodiment, a speaker verification system may be trained by obtaining an utterance that comprises a plurality of frames and has a plurality of feature vectors. In such an embodiment, the feature vectors present in each frame may be identified and the presence of feature vectors by frame for the whole utterance may be tabulated. Next, the number of instances each feature vector is repeated in the utterance may be identified from which a total sum of all repeating instances in the utterance may be calculated. The number of repeats for each feature vector may then be divided by the total sum to obtain an averaged value for each feature vector and the information about the number of repeats for each feature vector may be stored in a reference log associated with the utterance. In one implementation, the reference logs of a plurality of utterances made by a plurality of speakers may be examined to identify a set of feature vectors comprising all of the different feature vectors present in the reference logs. For each different feature vector, the largest number of repeat instances for that feature vector in a single reference log may then be identified and a global reference log may be generated that indicates the largest number of repeat instances for every feature vector.

For purposes of the various embodiments described herein, an utterance may be isolated words or phrases and may also be connected or continuous speech. In accordance with one embodiment, a short utterance for purposes of implementation may be considered an utterance having a duration less than about four seconds and preferably up to about three seconds. A short utterance may also be multi-syllabic and/or comprise a short phrase (i.e., a plurality of separate words with short spaces between the words).

A language vocabulary subset may comprise a logical or descriptive subset of the vocabulary of a given language (e.g., English, German, French, Mandarin, etc.). An illustrative language vocabulary subset may comprise, for example, the integers 1 through 10. A token may be defined as an utterance made by a speaker. Thus, in the illustrative language vocabulary subset, a first token may comprise the utterance "one", a second token may comprise the utterance "two," and so up to a tenth token for the utterance "ten."

In embodiments of the speaker verification system architecture, a time tag count field may be included with each entry of a codebook. Once trained and populated, the codebook may be subjected to a second round of training.

It should be understood that like terms found in the various previously described pseudo codes may be similarly defined, unless noted in the respective pseudo code.

Accordingly, implementations of the present speaker verification system architecture may help to improve traditional vector quantization systems by taking into account temporal information in a persons voice for short utterances and reducing the affect of background noise. Embodiments of the present invention may help to reduce the cost of implementing speaker verification systems while providing comparable verification accuracy to existing speaker verification solutions. In addition, embodiments of the speaker verification system architecture described herein may help to reduce the time for performing enrollment into the verification system as well as the time needed to perform verification. The implementation cost of the speaker verification system architecture may be lowered by improving the execution speed of the algorithm. The speaker verification system architecture may use a low complexity modified vector quantization techniques for data classification. With the present speaker verification system architecture, short voiced utterances may be used for reliable enrollment and verification without reduction in verification accuracy. Short voiced utterances and reduced execution time helps to quicken enrollment and verification times and therefore reduces the amount of time that a user has to spend during enrollment and verification. Embodiments of the present speaker verification system architecture may also help to afford noise robustness without the use of elaborate noise suppression hardware and software.

Embodiments of the verification system architecture may be used to implement security or convenience features (e.g. a personal zone configuration) for resource-constrained products such as, for example, like cell phones, navigation systems (e.g., GPS), environmental control panel, etc. Embodiments of the verification system architecture may be implemented in non-intrusive applications such as in a transaction system where a person's spoken name may be used (or is typically used) to identify the person including implementations where the person's identity may be verified without the person being aware that the verification process is going on.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

In the present description, the various sub-components of each of the components may also be considered components of the system. For example, particular software modules executed on any component of the system may also be considered components of the system. One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed:

1. A method for verifying an identity of a speaker, comprising:
    receiving feature vectors extracted from an utterance received from a microphone and made by a speaker claiming an identity;
    measuring dissimilarity between the feature vectors and a codebook associated with a version of the utterance known to be made by the identity;
    analyzing the utterance to ascertain information about repeating occurrences of the feature vectors in the utterance;
    comparing the information about repeating occurrences of feature vectors occurring in the utterance with information about repeating occurrences of feature vectors in a version of the utterance known to be made by the claimed identity;
    assigning a penalty to the measured dissimilarity based on the comparison; and
    determining whether to accept the speaker as the identity using the measured dissimilarity modified by the assigned penalty, wherein if the number of repeating occurrences for any of the feature vectors of the utterance exceeds a maximum number, rejecting the speaker as the identity, and wherein an additional penalty is assigned to the dissimilarity if any of the feature vectors of the utterance is determined to have a number of repeating occurrences exceeding the maximum number.

2. The method of claim 1, wherein the determining whether to accept the speaker as the identity further comprises comparing the measured dissimilarity modified by the assigned penalty to a valid-imposter model associated with the utterance.

3. The method of claim 1, wherein the utterance comprises a plurality of frames, and wherein analyzing the utterance further comprises identifying the feature vectors occurring in each frame, counting the instances that each different feature vector of the utterance occurs in all of the frames to obtain a sum of repeating occurrences of each feature vector, and dividing each sum by a total number of repeating occurrences occurring in the utterance.

4. The method of claim 1, wherein an additional penalty is assigned to the dissimilarity if total number of the feature vectors with repeating occurrences exceeding the maximum number exceeds a predetermined number.

5. The method of claim 1, wherein an additional penalty is assigned to the dissimilarity if total number of the feature vectors with repeating occurrences exceeds a predetermined number.

6. A method for verifying an identity of a speaker, comprising:
    receiving feature vectors extracted from an utterance received from a microphone and made by a speaker claiming an identity;
    measuring dissimilarity between the feature vectors and a codebook associated with a version of the utterance known to be made by the identity;

analyzing the utterance to ascertain information about repeating occurrences of the feature vectors in the utterance;

comparing the information about repeating occurrences of feature vectors occurring in the utterance with information about repeating occurrences of feature vectors in a version of the utterance known to be made by the claimed identity;

assigning a penalty to the measured dissimilarity based on the comparison; and determining whether to accept the speaker as the identity using the measured dissimilarity modified by the assigned penalty, wherein if the number of repeating occurrences for any of the feature vectors of the utterance exceeds a maximum number, rejecting the speaker as the identity, and wherein the maximum number for a given feature vector is obtained by analyzing a plurality of utterances made by a plurality of speakers to identify the utterance of the plurality of utterances having the largest number of repeating occurrences of the given feature vector.

7. A method for verifying an identity of a speaker, comprising:

receiving feature vectors extracted from an utterance received from a microphone and made by a speaker claiming an identity;

measuring dissimilarity between the feature vectors and a codebook associated with a version of the utterance known to be made by the identity;

analyzing the utterance to ascertain information about repeating occurrences of the feature vectors in the utterance;

comparing the information about repeating occurrences of feature vectors occurring in the utterance with information about repeating occurrences of feature vectors in a version of the utterance known to be made by the claimed identity;

assigning a penalty to the measured dissimilarity based on the comparison; and determining whether to accept the speaker as the identity using the measured dissimilarity modified by the assigned penalty, wherein the assigned penalty comprises a penalty for each of the feature vectors of the utterance, wherein the assigned penalty for each feature vector is based on a difference between a number of repeating occurrences of the respective feature vector of the utterance and a number of repeating occurrences of the corresponding feature vector of the version of the utterance know to be made by the identity.

8. The method of claim 7, wherein the assigned penalty for a given feature vector is reduced if the difference between the number of repeating occurrences of the respective feature vector of the utterance and the number of repeating occurrences of the corresponding feature vector of the version of the utterance know to be made by the identity is determined to be less than a predefined value.

9. The method of claim 7, wherein the assigned penalty for given feature vector is adjusted based on the degree of difference between the number of repeating occurrences of the respective feature vector of the utterance and the number of repeating occurrences of the corresponding feature vector of the version of the utterance know to be made by the identity.

10. The method of claim 7, wherein the assigned penalty for each feature vector is adjusted to account for operational characteristics of a device used to capture the utterance by the speaker.

11. The method of claim 7, wherein no penalty is assigned to a given feature vector if the difference between the number of repeating occurrences of the respective feature vector of the utterance and the number of repeating occurrences of the corresponding feature vector of the version of the utterance know to be made by the identity is determined to be less than an expected difference of repeating occurrences occurring due to expected changes in voice.

* * * * *